United States Patent
Yamada et al.

(10) Patent No.: US 6,755,903 B2
(45) Date of Patent: Jun. 29, 2004

(54) METAL CHELATED DYESTUFF FOR INKJET RECORDING AND AQUEOUS INKJET RECORDING LIQUID USING THE SAME

(75) Inventors: Masahiro Yamada, Kanagawa (JP); Tomio Yoneyama, Kanagawa (JP); Tomohiro Chino, Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 31 days.

(21) Appl. No.: 10/177,148

(22) Filed: Jun. 24, 2002

(65) Prior Publication Data

US 2003/0088077 A1 May 8, 2003

Related U.S. Application Data

(63) Continuation of application No. PCT/JP00/09041, filed on Dec. 20, 2000.

(30) Foreign Application Priority Data

Dec. 24, 1999 (JP) .......................................... 11-367093
Jul. 4, 2000 (JP) ...................................... 2000-202239

(51) Int. Cl.$^7$ .......................... C09D 11/02; C09B 45/14
(52) U.S. Cl. ............................... 106/31.45; 106/31.48; 106/31.5; 534/693; 534/703; 534/705; 534/707; 534/710; 534/711; 534/712
(58) Field of Search ........................ 106/31.45, 31.48, 106/31.5; 534/693, 703, 705, 707, 710, 711, 712

(56) References Cited

U.S. PATENT DOCUMENTS 4,273,706 A    6/1981  Chapman et al.
4,521,506 A    6/1985  Stolzenburg et al.
4,524,123 A    6/1985  Schenk et al.
4,600,681 A    7/1986  Bergthaller et al.
4,962,191 A   10/1990  Puentener et al. .......... 534/698
5,102,459 A    4/1992  Ritter et al. .................. 106/22
5,330,542 A  * 7/1994  Maeda et al. .................. 8/639
5,980,622 A  * 11/1999 Byers ....................... 106/31.48
6,551,682 B1 * 4/2003  Tosaki et al. .............. 428/64.1

FOREIGN PATENT DOCUMENTS

EP    0 481 449 A2    4/1992
EP       716931  *    6/1996
JP      58-176267    10/1983
JP        11-5931     1/1993
JP      10-259331     9/1998

OTHER PUBLICATIONS

Komarek et al., Chemical Abstracts, 92:68985, 1980.*
Komamura et al., Chemical Abstracts, 117:561053, 1992.*

* cited by examiner

Primary Examiner—Fiona T. Powers
(74) Attorney, Agent, or Firm—Oblon, Spivak, McClelland, Maier & Neustadt, P.C.

(57) ABSTRACT

A metal chelated dyestuff for inkjet recording is described, which is a water soluble azo metal chelated compound formed from an azo compound represented by the following general formula (1) and a metal element and is good at the clearness of color tone, light resistance, indoor discoloring and fading property, solubility, storage stability, and the like.

(1)

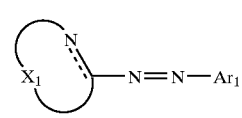

32 Claims, No Drawings

METAL CHELATED DYESTUFF FOR INKJET RECORDING AND AQUEOUS INKJET RECORDING LIQUID USING THE SAME

TECHNICAL FIELD

The present invention relates to a water soluble dyestuff for inkjet recording and an aqueous inkjet recording liquid using the same. More specifically, it relates to a metal chelated dyestuff comprising a water soluble azo metal chelated compound suitable for inkjet recording and an aqueous inkjet recording liquid using the same.

BACKGROUND ART

The recording by blowing drops of recording liquid containing a water soluble dye such as a direct dye or an acid dye from a minute orifice, so-called inkjet recording method has been practically used.

With regard to the recording liquid, it is required to exhibit fast fixing to a recording paper widely used at general office work such as a paper for PPC (plain paper copier), i.e., a paper for electrophotography, fanhold paper (a continuous paper for computer, etc.), or the like, and also a good print quality of a printed matter, that is, no blotting and a clear outline. In addition, it is necessary to be excellent in stability during storage as a recording liquid. Therefore, the solvents which are possible to use are strictly limited.

With regard to the dye for the recording liquid, it is required that it has a sufficient solubility for the above limited solvents, and, in addition, is stable as a recording liquid even when it has been stored for a long period of time, and a printed image has high saturation and density, as well as the dye is excellent in water resistance, light resistance and indoor discoloring and fading property.

On the other hand, for forming a full color image in the inkjet recording method, using inks of three primary colors of yellow (Y), magenta (M) and cyan (C) or four colors wherein black (B) is additionally used, an image is formed by controlling the discharging amount of each ink through the mixing of these colors on a material to be recorded. Furthermore, at the formation of a full color image, it is necessary to express not only difference of colors but also shade of colors. The shade part is usually formed by the use of two or more inks different in concentration of dyestuff.

However, with regard to the conventional dyestuffs for inkjet, there is a problem of fading of an image caused by light irradiation, that is, a poor light resistance. In particular, it is a problem that a pale color part where an ink low in concentration of dyestuff is used exhibits a poor light resistance. Thus, it is desired to develop a dyestuff for inkjet which satisfies these many requirements at the same time.

In particular, as the magenta dyestuff to be used in the recording liquid, a metal-free direct dye (C.I. DR-227) and an acid dye (C.I. AR-249) which are commercially available dyes are hitherto employed (by the way, "C.I." means "Color Index", "AR" means "Acid Red", and "DR" means "Direct Red".).

A direct dye is unclear in color tone, but an acid dye showing a clear color tone tends to exhibit an inferior light resistance. Moreover, heretofore, a metal-containing azo dye has a good light resistance but exhibits a somber color tone and poor clearness. Therefore, it is desired to develop a dyestuff for inkjet which satisfies both of the color tone and light resistance.

Japanese Patent Laid-Open No. 42775/1982 discloses an aqueous ink for inkjet printing wherein at least one kind of 5-hydroxypyrazole azo dye having an azo group at the 4-position or complex salt dye thereof with copper, nickel or cobalt. However, the bonding position of the pyrazole ring to the azo group of the dye described therein is different from that in the general formula (1) of the invention.

Japanese Patent Laid-Open No. 259331/1998 discloses an aqueous inkjet recording liquid which contains a water soluble metal complex formed from a benzene azo compound and at least one kind of metal selected from nickel, cobalt, chromium or copper. However, the metal complex is different from the compound of the general formula (1) of the invention in view that the complex does not have a naphthalene ring.

Japanese Patent Laid-Open No. 140367/1999 discloses an ink composition containing a magenta dye ligand of 4-hydroxy-3-(2'-pyridylazo)-1-(sulfo substituted) naphthalene which coordinates to a polyvalent metal ion, and an ink vehicle. However, there is a difference in view that the compound of the general formula (1) of the invention is an azo compound having no pyridine ring.

These dyestuffs described in the known literatures not always satisfy the properties required for the dyestuff for inkjet printing such as clearness of color tone, light resistance, indoor discoloring and fading property, solubility, storage stability, and the like, sufficiently.

An object of the invention is to provide a water soluble dyestuff for inkjet printing which result in a good print quality even at printing on a plain paper and also a clear color tone with a high density, an excellent light resistance, small indoor discoloring and fading of a printed image, and exhibits a good solubility or stability during a long time storage of the dyestuff, and an aqueous inkjet printing liquid using the same.

DISCLOSURE OF THE INVENTION

The present inventors have achieved the above object by the use of a water soluble dyestuff which is an azo chelated compound of a specific azo compound with a metal element.

Namely, the gist of the invention is a metal chelated dyestuff for inkjet recording which is a water soluble azo metal chelated compound formed from an azo compound represented by the following general formula (1) and a metal element, and an aqueous ink jet recording liquid which contains at least one kind of the dyestuff selected from the metal chelated dyestuff and an aqueous medium.

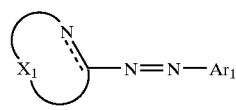
(1)

(where general formula (1) represents an azo dyestuff compound having at least one or more hydrophilic group in a molecule, $X_1$ represents plural atoms required for forming at least one 5- to 7-membered heterocyclic ring, the heterocyclic ring containing $X_1$ being a heterocyclic ring other than pyridine ring. The heterocyclic ring containing $X_1$ may have substituent(s) on the heterocyclic ring, the substituent(s) on the heterocyclic ring may form a condensed ring through further condensation. The condensed heterocyclic ring containing $X_1$ may be substituted. $Ar_1$ represents a naphthyl group represented by the following general formulae (2)–(4). $Y_1$ represents a chelating group, $Z_1$ represents any substituent which may be different from each other, and a represents an integer of 0 to 6.)

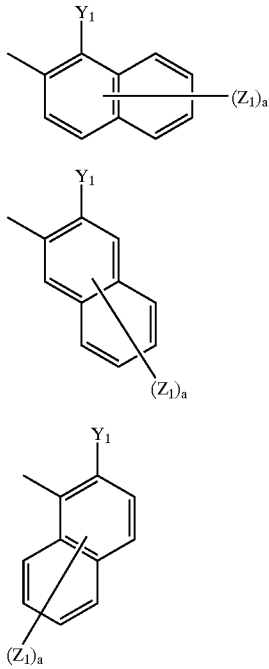

BEST MODE FOR CARRYING OUT THE INVENTION

The following will explain the present invention in detail.

The metal chelated dyestuff of the invention is a water soluble azo metal chelated compound formed from an azo compound represented by the above general formula (1) and a metal element.

$X_1$ represents two or more atoms necessary for forming at least one 5- to 7-membered heterocyclic ring but the heterocyclic ring containing $X_1$ is a heterocyclic ring other than pyridine ring. The heterocyclic ring containing $X_1$ is preferably imidazole ring, pyrazole ring, isoxazole ring, thiazole ring, thiadiazole ring, pyridazine ring, pyrimidine ring, pyrazine ring, benzothiazole ring, benzoxazole ring, or benzimidazole ring. Among them, it is preferred that the heterocyclic ring containing $X_1$ is imidazole ring, pyrazole ring, thiazole ring, or thiadiazole ring.

The heterocyclic ring containing $X_1$ may have one or more subtituents on the heterocyclic ring, and the substituent (s) on the heterocyclic ring may form a condensed ring through further condensation. In that case, the substituents on the heterocylic ring each is selected independently from alkyl group which may be substituted (e.g., alkyl group having 1 to 6 carbon atoms such as methyl group, ethyl group, or the like, carboxymethyl group, carboxyethyl group, trifluoroniethyl group, or the like), aryl group which may be substituted (preferably aryl group having 6 to 10 carbon atoms, e.g., phenyl group, naphthyl group, or the like), aralkyl group which may be substituted (benzyl group or the like, preferably aralkyl group having 7 to 10 carbon atoms in total), alkenyl group which may be substituted (e.g., vinyl group, 2-propenyl group, or the like), alkoxy group which may be substituted (preferably alkoxy group having 1 to 6 carbon atoms, e.g., methoxy group, ethoxy group, or the like), aryloxy group which may be substituted (e.g., phenoxy group, or the like), acyloxy group which may be substituted (preferably alkanoyloxy group having 2 to 7 carbon atoms such as acetyloxy group, benzoyloxy group, or the like), alkoxycarbonyl group which may be substituted (preferably alkoxycarbonyl group having 2 to 7 carbon atoms, e.g., methoxYcarbonyl, ethoxycarbonyl, or the like), aryloxycarbonyl group which may be substituted (e.g., phenoxycarbonyl group, naphthyloxycarbonyl group, or the like), carbamoyl group which may be substituted, acyl group which may be substituted (e.g., acyl group having 2 to 10 carbon atoms such as acetyl group, or the like), carboxyl group, hydroxyl group, cyano group, acylamino group which may be substituted (e.g., alkanoylamino group having 2 to 7 carbon atoms such as acetylamino group, benzoylamino group, or the like), nitro group, halogen atom (e.g., chlorine atom, bromine atom, fluorine atom, or the like), phosphono group, sulfo group, mercapto group, alkylthio group which may be substituted (e.g., allcylthio group having 1 to 6 carbon atoms such as methylthio group or ethylthio group, or the like), alkylsulfoxy group which may be substituted (e.g., alkylsulfoxyl group having 1 to 6 carbon atoms such as methylsulfoxy group or ethylsulfoxy group, or the like), alkylsulfonyl group which may be substituted (e.g., alkylsulfonyl group having 1 to 6 carbon atoms such as methylsulfonyl group or ethylsulfonyl group, or the like), and thiocyanato group.

Among them, a metal chelated dyestuff is preferred wherein, in the general formula (1), the heterocyclic ring containing $X_1$ is preferably represented by the following general formula (5), (6), (7) or (8).

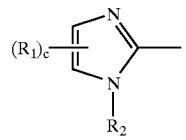

(5)

(where $R_1$ may be different from each other, is a group selected from alkyl group which may be substituted, aryl group which may be substituted, aralkyl group which may be substituted, alkoxy group which may be substituted, aryloxy group which may be substituted, acyloxy group which may be substituted, alkoxycarbonyl group which may be substituted, aryloxycarbonyl group which may be substituted, carboxyl group, carbamoyl group which may be substituted, hydroxyl group, acyl group which may be substituted, cyano group, acylamino group which may be substituted, nitro group, halogen atom, sulfo group, mercapto group, alkylthio group which may be substituted and thiocyanato group, $R_1$ may further form a condensed ring together with an imidazole ring, c represents an integer of 0 to 2. $R_2$ represents hydrogen atom, alkyl group which may be substituted, aryl group which may be substituted and allyl group which may be substituted.)

In particular, preferred is the case that $R_1$ is an alkoxycarbonyl group which may be substituted, carboxyl group, or cyano group and preferred is the case that $R_2$ is hydrogen atom or alkyl group which may be substituted. Most preferred is the case that c is 2, both of the two $R_1$'s are cyano groups, and $R_2$ is hydrogen atom or alkyl group which may be substituted.

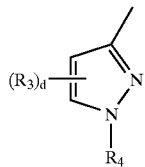
(6)

(where $R_3$ may be different from each other and represents alkyl group which may be substituted, aryl group which may be substituted, aralkyl group which may be substituted, alkoxycarbonyl group which may be substituted, aryloxycarbonyl group which may be substituted, carboxyl group, carbamoyl group which may be substituted, hydroxyl group, cyano group or sulfo group, d represents an integer of 0 to 2. $R_4$ represents hydrogen atom, alkyl group which may be substituted or aryl group which may be substituted.)

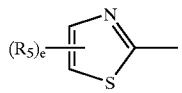
(7)

(where $R_5$ may be different from each other and represents alkyl group which may be substituted, aryl group which may be substituted, aralkyl group which may be substituted, alkoxy group which may be substituted, aryloxy group which may be substituted, acyloxy group which may be substituted, alkoxycarbonyl group which may be substituted, aryloxycarbonyl group which may be substituted, carboxyl group, hydroxyl group, acyl group which may be substituted, cyano group, acylamino group which may be substituted, nitro group, halogen atom, sulfo group, alkylthio group which may be substituted or arylthio group which may be substituted, and $R_5$ may further form a condensed ring together with thiazole ring, e represents an integer of 0 to 2.)

Preferred are the case that $R_5$ is alkyl group which may be substituted, the case that e=0 and $R_5$ is absent, or the case that $R_5$ forms a condensed ring together with thiazole ring.

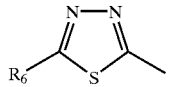
(8)

(where $R_6$ represents hydrogen atom, alkyl group which may be substituted, aryl group which may be substituted, aralkyl group which may be substituted, mercapto group, alkylthio group which may be substituted, alkylsulfoxy group which may be substituted or alkylsulfonyl group which may be substituted.)

$R_6$ is preferably hydrogen atom or alkyl group which may be substituted.

Among the heterocyclic rings represented by the above general formula (5), (6), (7) or (8), preferred is imdazole ring represented by the general formula (5).

Moreover, $Ar_1$ in the general formula (1) is naphthyl group represented by the general formula (2), (3) or (4), and $Y_1$ is a chelating group. Y1 is preferably hydroxyl group, carboxyl group, amino group which may be substituted (e.g., amino group, methylaniino group, bis(2-hydroxyethyl) amino group, or the like), sulfo group, carbanioyl group, alkoxy group which may be substituted (e.g., methoxy group, 2-hydroxyethoxy group, or the like), allcylthio group which may be substituted (e.g., methylthio group, 2-hydroxyethylthio group, or the like), alkylsulfonylamino group which may be substituted (e.g., methylsulfonylaniino group or the like), or arylsulfonylamino group which may substituted (e.g., benzenesulfonylamino group or the like). More preferred is the case that $Y_1$ is hydroxyl group.

It is preferable that $Z_1$ in the general formulae (2) to (4), each is independently a group selected from alkoxy group which may be substituted (e.g., alkoxy group having 1 to 6 carbon atoms such as methoxy group or ethoxy group, or the like), aryloxy group which may be substituted (e.g., phenoxy group, or the like), acyloxy group which may be substituted (e.g., alkanoyloxy group having 2 to 7 carbon atoms such as acetyloxy group, benzoyloxy group, or the like), alkoxycarbonyl group which may be substituted (e.g., alkoxycarbonyl group having 2 to 7 carbon atoms such as methoxycarbonyl, ethoxycarbonyl, or the like), aryloxycarbonyl group which may be substituted (e.g., phenoxycarbonyl group, naphthyloxycarbonyl group, or the like), carboxyl group, carbamoyl group which may be substituted (e.g., carbamoyl group or the like, carboxyanilide group which may be substituted (3-sulfocarboxyanilide group or the like), hydroxyl group, amino group which may be substituted (e.g., amino group, alkylamino group having 1 to 6 carbon atoms such as methylamino group, or the like), ureido group, acylamino group which may be substituted (e.g., alkanoylamino group having 2 to 7 carbon atoms such as acetylamino group, benzoylamino group, or the like), alkylsulfonylamino group which may be substituted (e.g., alkylsulfonylamino group having 1 to 6 carbon atoms such as methylsulfonylamino group, or the like), arylsulfonylamino group which may be substituted (e.g., phenylsulfonylamino group, 4-methylphenylsulfonylamino group, or the like), phosphono group, sulfo group, and sulfamoyl group which may be substituted (e.g., sulfamoyl group, N,N-bis(carboxymethyl)sulfamoyl group, or the like), a represents an integer of 0 to 6.

$Z_1$ is preferably carboxyl group, carbamoyl group which may be substituted, sulfo group, or sulfamoyl group which may be substituted. a is preferably an integer of 1 to 3, more preferably 1 or 2.

Furthermore, among the naphthyl groups represented by the general formula (2), (3) or (4), preferred is the general formula (2) or (4).

In particular, most preferred is the naphthyl group of the following general formula (4').

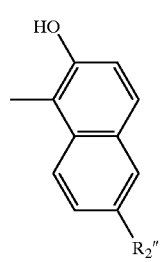
(4')

(where $R_2''$ represents sulfo group or sulfamoyl group which may be substituted.)

The azo compound represented by the general formula (1) is a compound having at least one hydrophilic group in a molecule other than $Y_1$ which is a chelating group. Examples of such hydrophilic group include sulfo group, carboxyl group, hydroxyl group, amino group, phosphono group, or the like. Of these, preferred is sulfo group or carboxyl group. It is more preferable that the azo compound represented by the general formula (1) is a compound having 1 to 3 sulfo groups or carboxyl groups in a molecule In the invention, examples of the metal forming a chelated compound together with the azo compound represented by the general formula (1) include silver (I), aluminum (III), gold (III), cerium (III, IV), cobalt (II, III), chromium (III), copper (I, II), europium (III) iron (II, III), gallium (III), germanium (IV), indium (III), lanthanum (III), manganese (II), nickel (II), palladium (II), platinum (II, IV), rhodium (II, III), ruthenium (II, III, IV), scandium (III), silicon (IV) samarium (III), titanium (IV), uranium (IV), zinc (II), zirconium (IV), and the like.

Preferred are nickel (II), cobalt (II, III), and copper (II). More preferred are nickel (II) and copper (II), and most preferred is nickel (II).

As an anion of the metal salt to be used at the production of the metal complex, a monovalent or divalent anion such as $Cl^-$, $Br^-$, $CH_3COO^-$, $SO_4^{2-}$, or the like may be mentioned.

The dyestuff for use in the invention may be used in a form of free acid, as it is, and when the dyestuff is formed as a salt form at the production, it may be used as it is, or may be converted to a desired salt form. Furthermore, a dyestuff wherein part of the acid groups is a salt form or a mixture of a salt-form dyestuff and a free acid-from dyestuff may be used. Examples of such salt form includes salts with alkali metals such as Na, Li, K, etc.; ammonium salts which may be substituted with alkyl group(s) or hydroxyalkyl group(s); or salts with organic amines. Examples of the organic amines include lower alkylamines, hydroxy-substituted lower alkylamines, carboxy-substituted lower alkylamines and polyamines having 2 to 10 alkyleneimine units having 2 to 4 carbon atoms, and the like. In these salt-form cases, the dyestuff is not limited to one kind of form and two or more kinds may be mixed.

Moreover, in the structure of the dyestuff for use in the invention, when two or more acid groups are contained in one molecule thereof, the two or more acid groups are salt forms or acid forms and may be different from each other.

As specific examples of the dyestuff include the dyestuffs having structures shown in following Table 1 to Table 6, but the invention is not limited thereto.

TABLE 1

| No. | 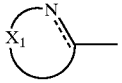 | —$Ar_1$ | Metal compound |
|---|---|---|---|
| 1-1 | 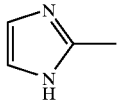 | 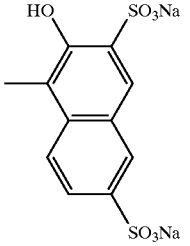 | $NiCl_2 \cdot 6H_2O$ |
| 1-2 | 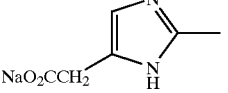 | 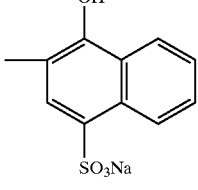 | $NiCl_2 \cdot 6H_2O$ |
| 1-3 | 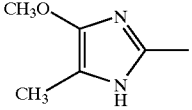 | 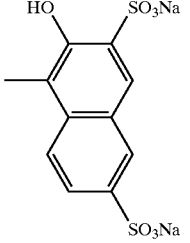 | $NiCl_2 \cdot 6H_2O$ |
| 1-4 | 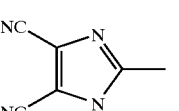 | 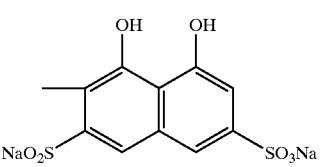 | $NiCl_2 \cdot 6H_2O$ |

TABLE 1-continued
| No. | 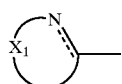 | —Ar₁ | Metal compound |
|---|---|---|---|
| 1-5 | 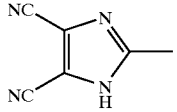 | 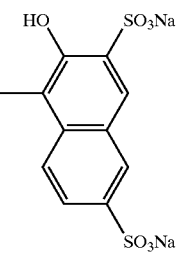 | NiCl$_2$.6H$_2$O |
| 1-6 | 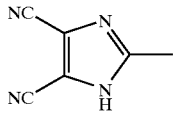 | 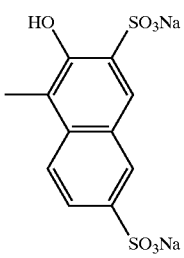 | CuCl$_2$.2H$_2$O |
| 1-7 | 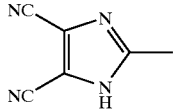 | 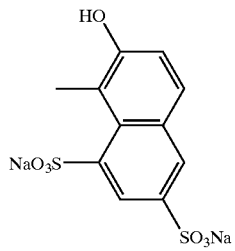 | NiCl$_2$.6H$_2$O |
| 1-8 | 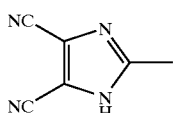 | 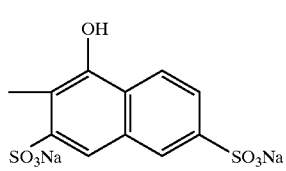 | NiCl$_2$.6H$_2$O |
| 1-9 | 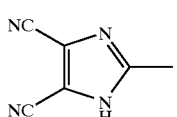 | 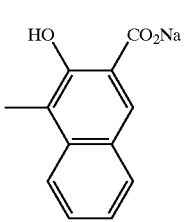 | NiCl$_2$.6H$_2$O |
| 1-10 | 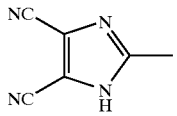 | 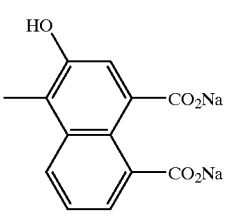 | NiCl$_2$.6H$_2$O |

TABLE 1-continued
| No. | 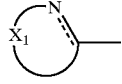 | —Ar₁ | Metal compound |
|---|---|---|---|
| 1-11 | 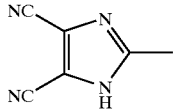 | 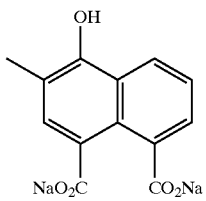 | NiCl$_2$·6H$_2$O |
| 1-12 | 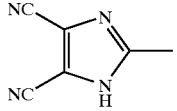 | 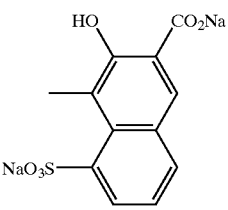 | NiCl$_2$·6H$_2$O |
| 1-13 | 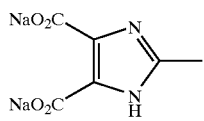 | 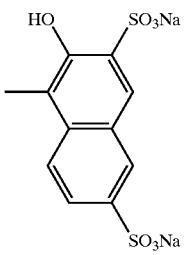 | NiCl$_2$·6H$_2$O |
| 1-14 | 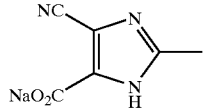 | 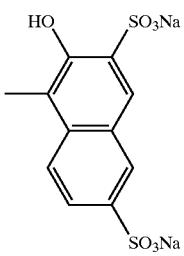 | NiCl$_2$·6H$_2$O |
| 1-15 | 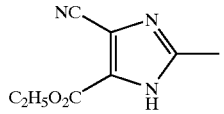 | 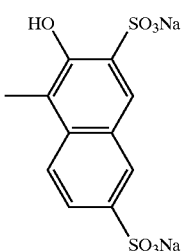 | NiCl$_2$·6H$_2$O |
| 1-16 | 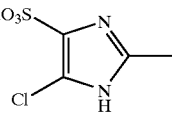 | 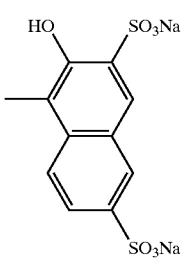 | NiCl$_2$·6H$_2$O |

TABLE 1-continued
| No. | 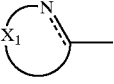 | —Ar₁ | Metal compound |
|---|---|---|---|
| 1-17 | 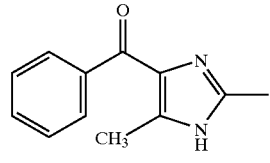 | 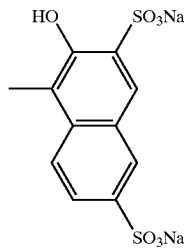 | NiCl₂.6H₂O |
| 1-18 | 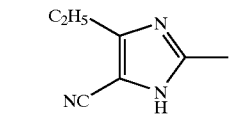 | 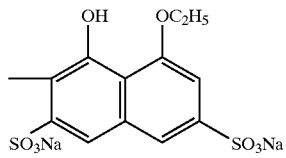 | NiCl₂.6H₂O |
| 1-19 | 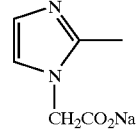 | 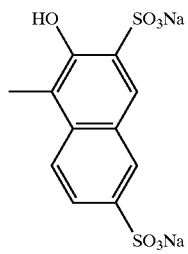 | NiCl₂.6H₂O |
| 1-20 | 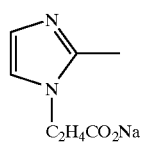 | 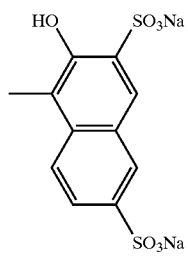 | NiCl₂.6H₂O |
| 1-21 | 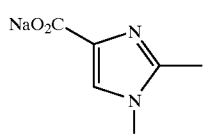 | 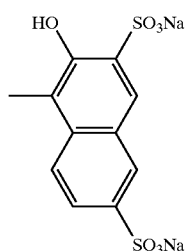 | NiCl₂.6H₂O |
| 1-22 | 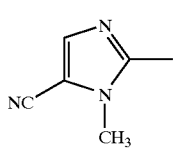 | 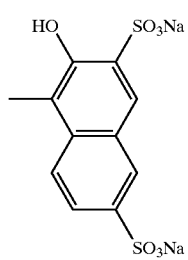 | NiCl₂.6H₂O |

TABLE 1-continued
| No. | 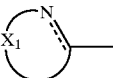 | —Ar₁ | Metal compound |
|---|---|---|---|
| 1-23 | 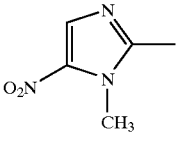 | 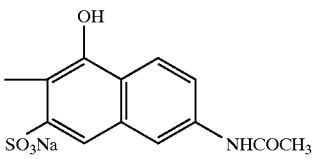 | NiCl₂·6H₂O |
| 1-24 | 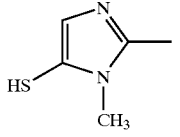 | 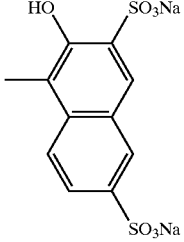 | NiCl₂·6H₂O |
| 1-25 | 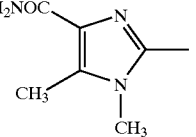 | 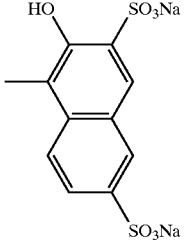 | NiCl₂·6H₂O |
| 1-26 | 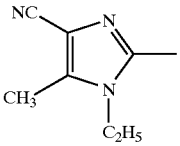 | 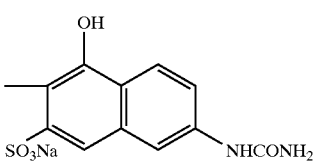 | NiCl₂·6H₂O |
| 1-27 | 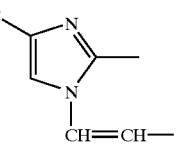 | 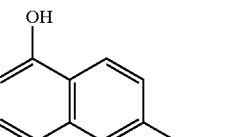 | NiCl₂·6H₂O |
| 1-28 | 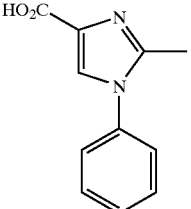 | 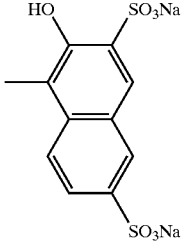 | NiCl₂·6H₂O |

TABLE 1-continued
| No. | 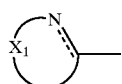 | —Ar$_1$ | Metal compound |
|---|---|---|---|
| 1-29 | 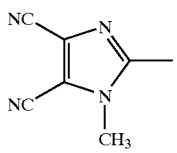 | 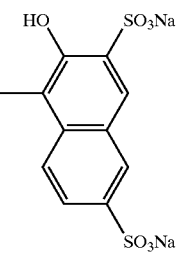 | NiCl$_2$.6H$_2$O |
| 1-30 | 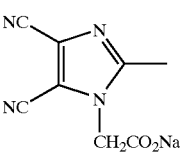 | 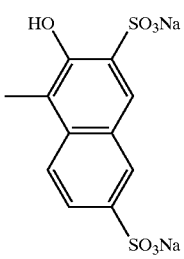 | NiCl$_2$.6H$_2$O |
| 1-31 | 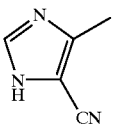 | 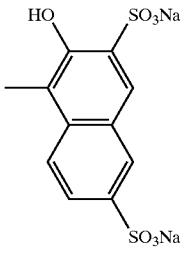 | NiCl$_2$.6H$_2$O |
| 1-32 | 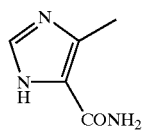 | 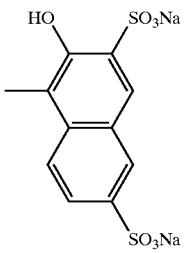 | NiCl$_2$.6H$_2$O |
| 1-33 | 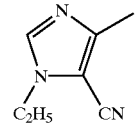 | 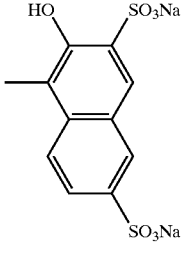 | NiCl$_2$.6H$_2$O |

TABLE 1-continued
| No. | 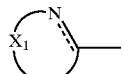 | —Ar₁ | Metal compound |
|---|---|---|---|
| 1-34 | 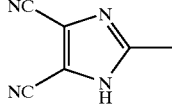 | 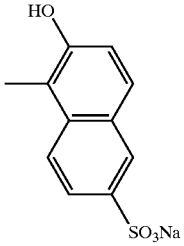 | $NiCl_2 \cdot 6H_2O$ |
| 1-35 | 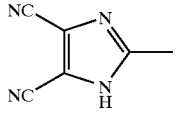 | 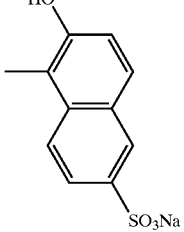 | $CuCl_2 \cdot 2H_2O$ |
| 1-36 | 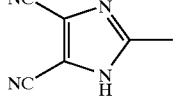 | 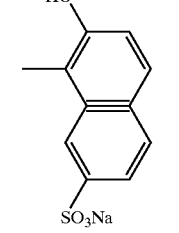 | $NiCl_2 \cdot 6H_2O$ |
| 1-37 | 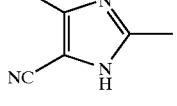 | 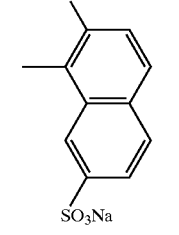 | $CuCl_2 \cdot 6H_2O$ |
| 1-38 | 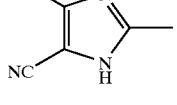 | 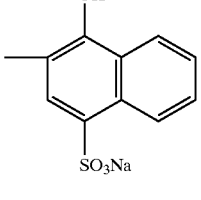 | $NiCl_2 \cdot 6H_2O$ |
| 1-39 | 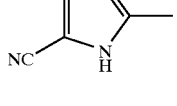 | 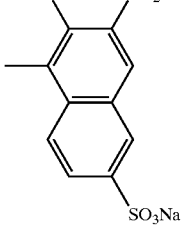 | $NiCl_2 \cdot 6H_2O$ |

TABLE 1-continued
| No. | 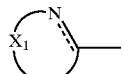 | —Ar$_1$ | Metal compound |
|---|---|---|---|
| 1-40 | 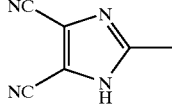 | 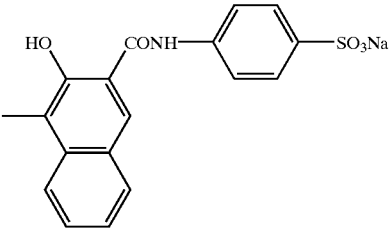 | NiCl$_2$.6H$_2$O |
| 1-41 | 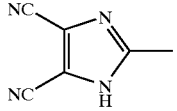 | 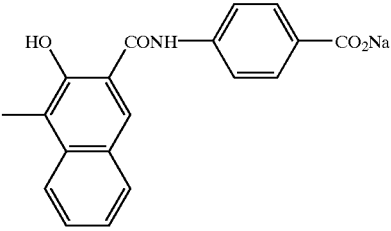 | NiCl$_2$.6H$_2$O |
| 1-42 | 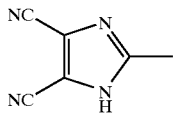 | 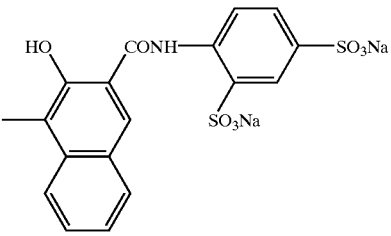 | NiCl$_2$.6H$_2$O |
| 1-43 | 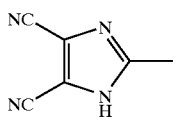 | 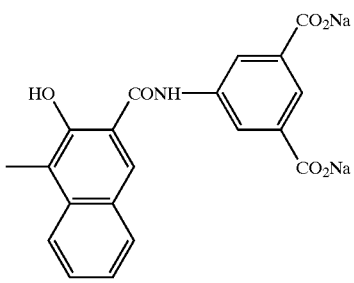 | NiCl$_2$.6H$_2$O |
| 1-44 | 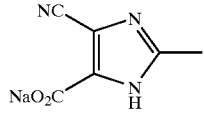 | 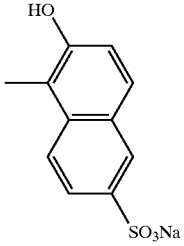 | NiCl$_2$.6H$_2$O |
| 1-45 | 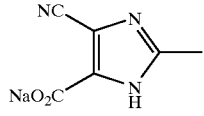 | 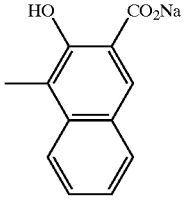 | NiCl$_2$.6H$_2$O |

TABLE 1-continued
| No. | 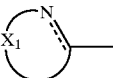 | —Ar₁ | Metal compound |
|---|---|---|---|
| 1-46 | 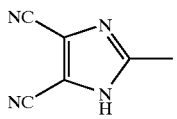 | 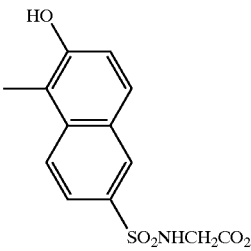 | $NiCl_2 \cdot 6H_2O$ |
| 1-47 | 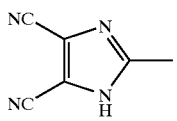 | 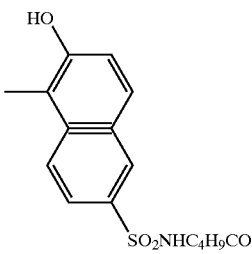 | $NiCl_2 \cdot 6H_2O$ |
| 1-48 | 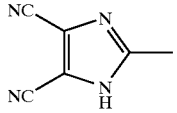 | 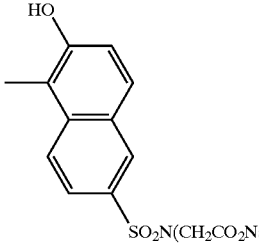 | $NiCl_2 \cdot 6H_2O$ |
| 1-49 | 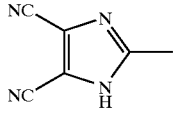 | 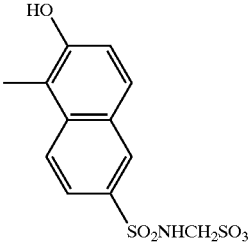 | $NiCl_2 \cdot 6H_2O$ |
| 1-50 | 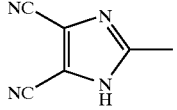 | 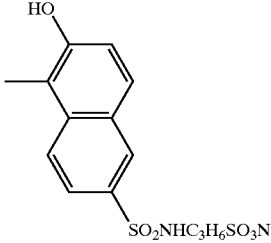 | $NiCl_2 \cdot 6H_2O$ |

TABLE 1-continued
| No. | 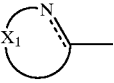 | —Ar₁ | Metal compound |
|---|---|---|---|
| 1-51 | 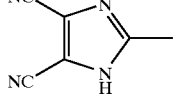 | 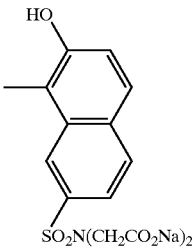 | NiCl₂.6H₂O |
| 1-52 | 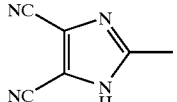 | 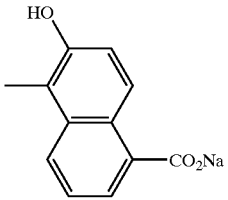 | NiCl₂.6H₂O |
| 1-53 | 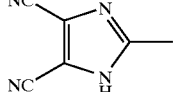 | 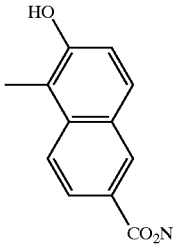 | Ni(CH₃COO)₂.4H₂O |
TABLE 2
| No. |  | —Ar₁ | Metal compound |
|---|---|---|---|
| 2-1 | 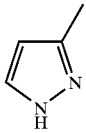 | 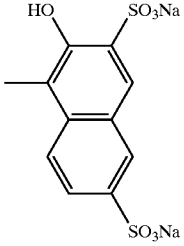 | NiCl₂.6H₂O |
| 2-2 | 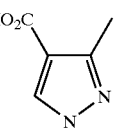 | 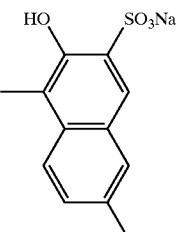 | NiCl₂.6H₂O |

TABLE 2-continued

| No. | (X₁–N=) structure | —Ar₁ | Metal compound |
|---|---|---|---|
| 2-3 | 3-methyl-4-(ethoxycarbonyl)-1H-pyrazole | 1-hydroxy-8-methyl-3,6-disulfonato (Na) naphthalene | NiCl₂·6H₂O |
| 2-4 | 3-methyl-4-cyano-1H-pyrazole | 1-hydroxy-8-methyl-3,6-disulfonato (Na) naphthalene | NiCl₂·6H₂O |
| 2-5 | 3-methyl-4-carbamoyl-1H-pyrazole | 1-hydroxy-8-methyl-3,6-disulfonato (Na) naphthalene | NiCl₂·6H₂O |
| 2-6 | 3,5-dimethyl-1H-pyrazole | 1-hydroxy-8-methyl-3,6-disulfonato (Na) naphthalene | NiCl₂·6H₂O |
| 2-7 | 3-methyl-5-hydroxy-1H-pyrazole | 1-hydroxy-8-methyl-3,6-disulfonato (Na) naphthalene | NiCl₂·6H₂O |
| 2-8 | 3-methyl-5-phenyl-1H-pyrazole | 4-hydroxy-3-methyl-2,7-disulfonato (Na) naphthalene | NiCl₂·6H₂O |

TABLE 2-continued
| No. | 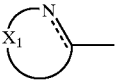 | —Ar₁ | Metal compound |
|---|---|---|---|
| 2-9 | 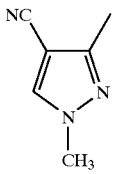 | 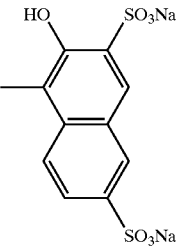 | NiCl$_2$.6H$_2$O |
| 2-10 | 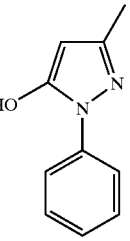 | 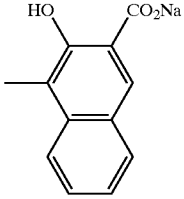 | NiCl$_2$.6H$_2$O |
TABLE 3
| No. |  | —Ar₁ | Metal compound |
|---|---|---|---|
| 3-1 | 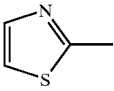 | 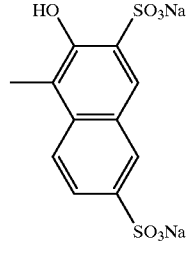 | NiCl$_2$.6H$_2$O |
| 3-2 | 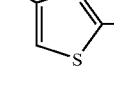 | 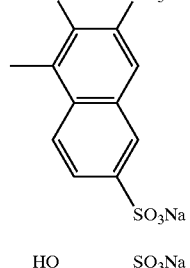 | NiCl$_2$.6H$_2$O |
| 3-3 | 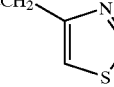 | 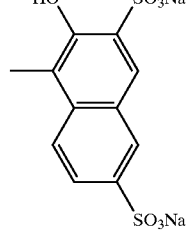 | NiCl$_2$.6H$_2$O |

TABLE 3-continued
| No. | 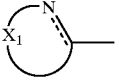 | —Ar₁ | Metal compound |
|---|---|---|---|
| 3-4 | 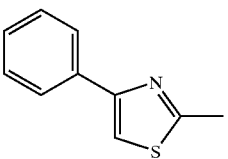 | 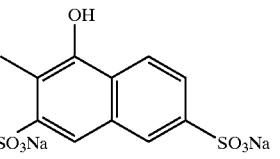 | NiCl₂·6H₂O |
| 3-5 | 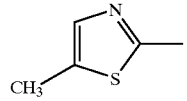 | 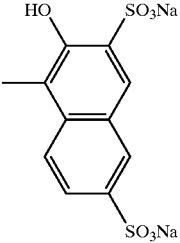 | NiCl₂·6H₂O |
| 3-6 | 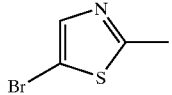 | 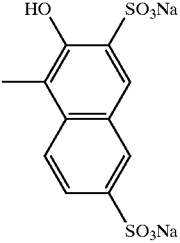 | NiCl₂·6H₂O |
| 3-7 | 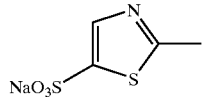 | 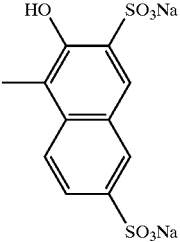 | NiCl₂·6H₂O |
| 3-8 | 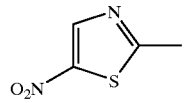 | 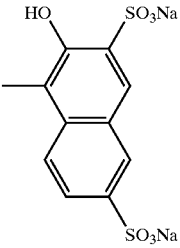 | NiCl₂·6H₂O |
| 3-9 | 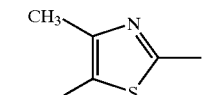 | 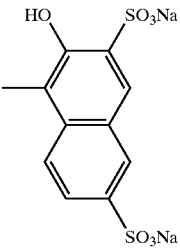 | NiCl₂·6H₂O |

TABLE 3-continued
| No. | 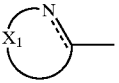 | —Ar₁ | Metal compound |
|---|---|---|---|
| 3-10 | 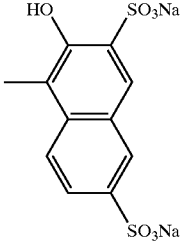 | 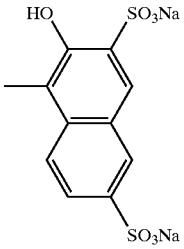 | NiCl$_2$.6H$_2$O |
| 3-11 | 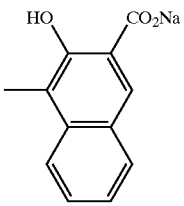 | 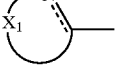 | NiCl$_2$.6H$_2$O |
| 3-12 | 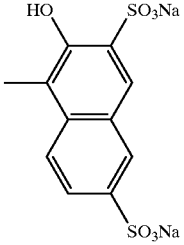 | 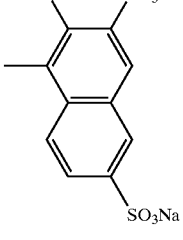 | NiCl$_2$.6H$_2$O |
TABLE 4
| No. | 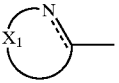 | —Ar₁ | Metal compound |
|---|---|---|---|
| 4-1 | | | NiCl$_2$.6H$_2$O |
| 4-2 | | | NiCl$_2$.6H$_2$O |

TABLE 4-continued
| No. | 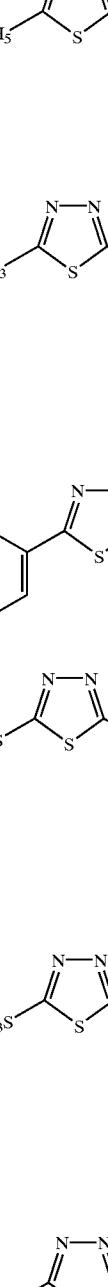 | —Ar$_1$ | Metal compound |
|---|---|---|---|
| 4-3 | 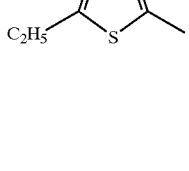 | 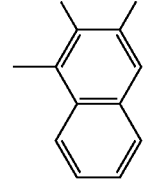 | NiCl$_2$·6H$_2$O |
| 4-4 | 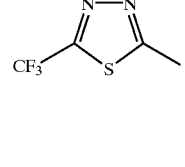 | 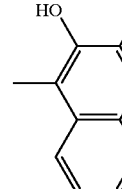 | NiCl$_2$·6H$_2$O |
| 4-5 | 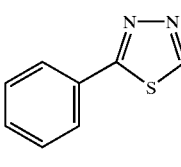 | 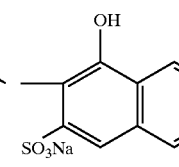 | NiCl$_2$·6H$_2$O |
| 4-6 | 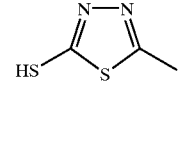 | 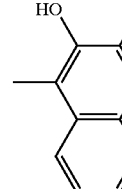 | NiCl$_2$·6H$_2$O |
| 4-7 | 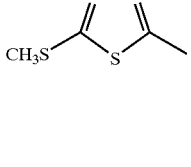 | 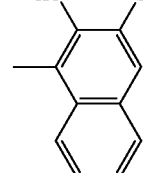 | NiCl$_2$·6H$_2$O |
| 4-8 | 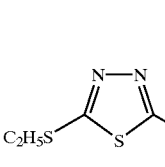 | 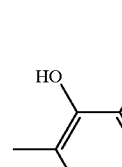 | NiCl$_2$·6H$_2$O |

TABLE 4-continued

| No. | (X₁ ring with N=N-methyl) | —Ar₁ | Metal compound |
|---|---|---|---|
| 4-9 | CH₃—S—(1,3,4-thiadiazole)—CH₃ | 4-methyl-3-hydroxy-2,7-naphthalenedisulfonic acid disodium salt | NiCl₂·6H₂O |
| 4-10 | CH₃—S(O)₂—(1,3,4-thiadiazole)—CH₃ | 4-methyl-3-hydroxy-2,7-naphthalenedisulfonic acid disodium salt | NiCl₂·6H₂O |
| 4-11 | (1,2,4-thiadiazole)—CH₃ | 4-methyl-3-hydroxy-2,7-naphthalenedisulfonic acid disodium salt | NiCl₂·6H₂O |
| 4-12 | 3,5-dimethyl-1,2,4-thiadiazole | 4-methyl-3-hydroxy-2,7-naphthalenedisulfonic acid disodium salt | NiCl₂·6H₂O |
| 4-13 | 3-(methylthio)-5-methyl-1,2,4-thiadiazole | 4-methyl-3-hydroxy-2,7-naphthalenedisulfonic acid disodium salt | NiCl₂·6H₂O |

TABLE 4-continued
| No. | 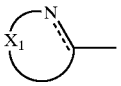 | —Ar₁ | Metal compound |
|---|---|---|---|
| 4-14 | 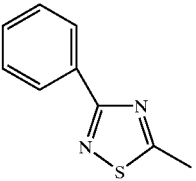 | 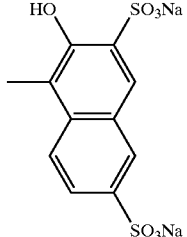 | NiCl₂·6H₂O |
| 4-15 |  | 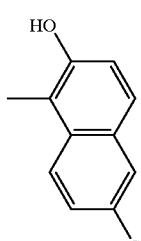 | NiCl₂·6H₂O |
TABLE 5
| No. | 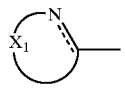 | —Ar₁ | Metal compound |
|---|---|---|---|
| 5-1 | 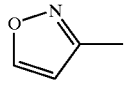 | 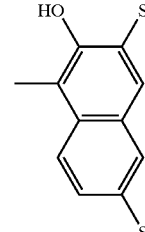 | NiCl₂·6H₂O |
| 5-2 | 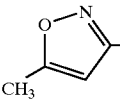 | 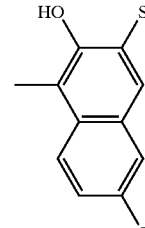 | NiCl₂·6H₂O |
| 5-3 | 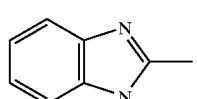 | 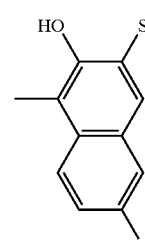 | NiCl₂·6H₂O |

TABLE 5-continued

| No. | ⟨X₁⟩N= (structure) | —Ar₁ | Metal compound |
|---|---|---|---|
| 5-4 | 5-chloro-2-methylbenzoxazole | 1-methyl-2-hydroxy-3,6-disulfonaphthalene (di-Na salt) | NiCl₂·6H₂O |
| 5-5 | 2-methylbenzothiazole | 2-methyl-1-hydroxy-4-sulfonaphthalene (Na salt) | NiCl₂·6H₂O |
| 5-6 | 6-sulfo-2-methylbenzothiazole (Na salt) | 1-methyl-2-hydroxy-3,6-disulfonaphthalene (di-Na salt) | NiCl₂·6H₂O |
| 5-7 | 6-carboxy-2-methylbenzothiazole (Na salt) | 1-methyl-2-hydroxy-3,6-disulfonaphthalene (di-Na salt) | NiCl₂·6H₂O |
| 5-8 | 6-sulfo-2-methylbenzothiazole (Na salt) | 1-methyl-2-hydroxy-6-sulfonaphthalene (Na salt) | NiCl₂·6H₂O |

TABLE 6

| No. | 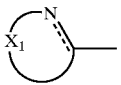 | —Ar₁ | Metal compound |
|---|---|---|---|
| 6-1 | 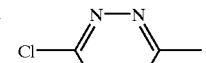 | 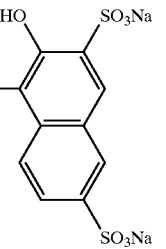 | NiCl₂.6H₂O |
| 6-2 | 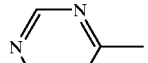 | 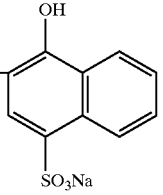 | NiCl₂.6H₂O |
| 6-3 | 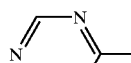 | 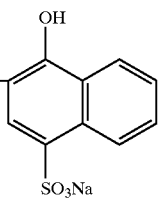 | NiCl₂.6H₂O |
| 6-4 | 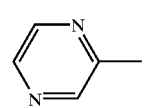 | 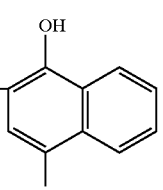 | NiCl₂.6H₂O |
| 6-5 | 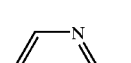 | 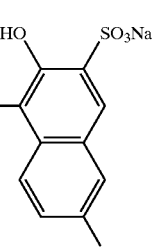 | NiCl₂.6H₂O |
| 6-6 | 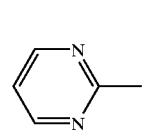 | 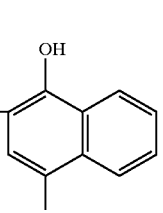 | NiCl₂.6H₂O |

TABLE 6-continued

| No. | 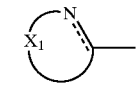 | —Ar₁ | Metal compound |
|---|---|---|---|
| 6-7 | 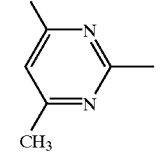 | 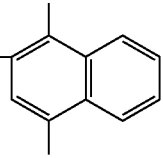 | NiCl₂.6H₂O |
| 6-8 | 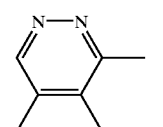 | 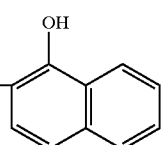 | NiCl₂.6H₂O |

The azo metal chelated compound which is a water soluble dyestuff of the invention can be produced from an azo compound represented by the general formula (1) and a metal compound.

The azo compound represented by the general formula (1) is obtained according to a known method.

(Method A) Diazo Coupling Method

A method which comprises the diazotization of the following compound:

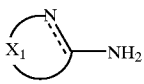

and coupling with H—Ar₁. Alternatively (Method B), the compound is obtained according to the method condensing a hydrazino compound with a 1,2-naphthoquinone derivative.

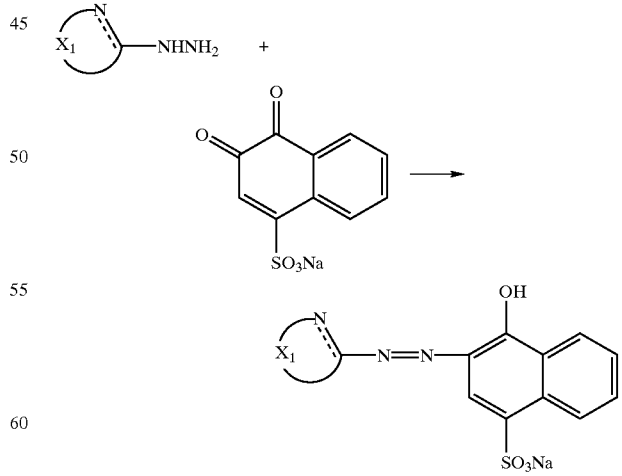

The water soluble azo metal chelated compound which is a compound of the invention can be produced by reacting the resulting azo dyestuff of the general formula (1) with a metal compound (e.g., NiCl₂.6H₂O, CuCl₂.2H₂O, or the like).

As the content of the water soluble dyestuff which is an azo chelated compound of the azo compound of the above general formula (1) with a metal in the recording liquid, the content of a deep color ink is preferably from 0.5 to 5% by weight, particularly from 2 to 4.5% by weight in total, relative to the total amount of the recording liquid. In the case that a pale color ink is used, the content of the dyestuff is preferably from 0.1 to 2% by weight, more preferably 0.1 to 1.5% by weight.

Moreover, the aqueous medium for use in the invention preferably contains water and, as a water soluble organic solvent, ethylene glycol, propylene glycol, butylene glycol, diethylene glycol, triethylene glycol, polyethylene glycol (weight average molecular weight: about 190 to 400), glycerol, N-methylpyrrolidone, N-ethylpyrrolidone, 1,3-dimethylimidazolidinone, thiodiethanol, dimethyl sulfoxide, ethylene glycol monoallyl ether, ethylene glycol monomethyl ether, diethylene glycol monomethyl ether, 2-pyrrolidone, sulfolane, ethyl alcohol, isopropanol, or the like, for example. These water soluble organic solvents are used usually in the range of 1 to 45% by weight relative to the total amount of the recording liquid. On the other hand, water is used in an amount of 50 to 95% by weight relative to the total amount of the recording liquid.

The quick-drying property and print quality after printing can be further improved by adding, to the recording liquid of the invention, 0.1 to 10% by weight, preferably 0.5 to 5% by weight of a compound selected from urea, thiourea, biuret, and semicarbazide relative to the total amount of the recording liquid or by adding 0.001 to 5% by weight of a surfactant relative to the total amount of the recording liquid.

EXAMPLES

The following will explain the invention further in detail with reference to Examples, but the invention is not limited to these Examples unless the gist of the invention is exceeded.

Diazo Coupling Example 1

A solution of water (206 ml), 35% hydrochloric acid (20 ml), and 2-amino-4,5-dicyanoimidazole (10.0 g) was cooled and an aqueous solution of sodium nitrite (5.5 g) dissolved in water (12 ml) was added thereto at 5 to 10° C. to effect diazotization.

An excess sodium nitrite was decomposed by sulfamic acid to obtain a diazo solution. Disodium 2-naphthol-3,6-disulfonate (27.5 g) was dissolved in water (284 ml), and the above diazo solution was added dropwise thereto at 0 to 5° C. with adjusting the pH to 8.0 to 9.0 with an aqueous NaOH solution. The solid mass formed was collected by filtration, washed with water, and dried to obtain the dyestuff represented by the following structural formula (L1) (34.1 g).

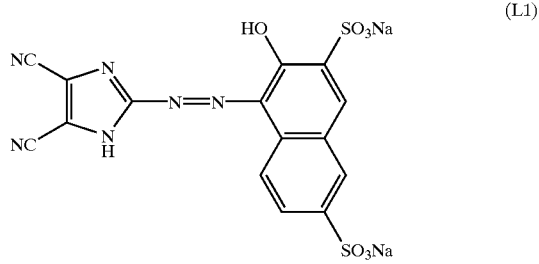

(L1)

Example 1

Preparation of a Nickel Chelated Dyestuff

Water (45 ml) was added to the azo dyestuff (3.0 g) of the structural formula (L1) and the dyestuff was dissolved by adjusting the pH to 10.0 with an aqueous NaOH solution. A solution of nickel(II) chloride-hexahydrate (0.72 g)/water (7 ml) was added dropwise thereto at 15 to 25° C. During the reaction, the pH was adjusted to 9.0 to 10.0 with an aqueous NaOH solution. Sodium chloride (1.0 g) was added and solid mass was collected by filtration. The resulting wet cake was dissolved by adding water (45 ml) and heating the whole to 50 to 55° C., followed by filtration.

To the resulting filtrate was added isopropyl alcohol (130 ml), and precipitate was collected by filtration and dried to obtain the nickel chelated compound of No. 1–5 in Table 1 (1.1 g).

The maximum absorption wavelength (in water) of the resulting nickel chelated dyestuff was found to be 529.0 nm.

Example 2

Preparation of a Copper Chelated Dyestuff

Water (300 ml) was added to the azo dyestuff (10.0 g) of the structural formula (L1) and the dyestuff was dissolved by adjusting the pH to 10.0 with an aqueous NaOH solution. Then, a solution of copper(II) chloride-dihydrate (1.73 g)/water (33 ml) was added dropwise thereto. During the reaction, the pH was adjusted to 9.0 to 10.0 with an aqueous NaOH solution. Sodium chloride (20 g) was added and solid mass was collected by filtration. The resulting wet cake was dissolved in water and isopropyl alcohol was added. Precipitate was collected by filtration and dried to obtain the copper chelated compound of No. 1-6 in Table 1 (5.0 g).

The maximum absorption wavelength (in water) of the resulting copper chelated dyestuff was found to be 544.0 nm.

Examples 3 to 19

Preparation of Nickel Chelated Dyestuffs

According to methods similar to Example 1, the following nickel chelated dyestuffs were produced: No. 1-9, No. 1-10, No. 1-14, No. 1-15, No. 1-34, No. 1-36, No. 1-38, No. 1-44, No. 1-45, No. 1-46, No. 1-48, No. 1-51, No. 1-52, No. 1-53 in Table 1; No. 5-5 No. 5-8 in Table 5; No. 6-8 in Table 6.

The maximum absorption wavelengths in water of these chelated dyestuffs were measured. The chelated dyestuff used in each Example and the maximum absorption wavelength in water were shown in following Table 7.

TABLE 7

| Example No. | Dyestuff No. | Maximum absorption wavelength (in water) (nm) |
|---|---|---|
| Example 1 | No. 1-5 | 529.0 |
| Example 2 | No. 1-6 | 544.0 |
| Example 3 | No. 1-9 | 521.0 |
| Example 4 | No. 1-10 | 525.5 |
| Example 5 | No. 1-14 | 531.0 |
| Example 6 | No. 1-15 | 528.5 |
| Example 7 | No. 1-34 | 514.0 |
| Example 8 | No. 1-36 | 518.0 |
| Example 9 | No. 1-38 | 528.0 |
| Example 10 | No. 1-44 | 517.5 |
| Example 11 | No. 1-45 | 528.0 |
| Example 12 | No. 1-46 | 512.0 |
| Example 13 | No. 1-48 | 513.0 |
| Example 14 | No. 1-51 | 521.0 |
| Example 15 | No. 1-52 | 519.0 |
| Example 16 | No. 1-53 | 517.0 |
| Example 17 | No. 5-5 | 577.0 |
| Example 18 | No. 5-8 | 562.5 |
| Example 19 | No. 6-8 | 561.5 |

Moreover, mass spectrum of No. 1-34 was measured on a magnetic field-type mass spectrometer (JMS-700 manufactured by JEOL) according to an elecrospray-ion method. Main peak, m/e=791 was observed and this was coincident with the metal:azo compound=1:2 complex of No. 1-34 (molecular weight: 792 $^{58}$Ni).

Example 20

Preparation of a Copper Chelated Dyestuff

According to a method similar to Example 2, a copper chelated dyestuff of No. 1-35 in Table 1 was produced.

The maximum absorption wavelength (in water) of the resulting copper chelated dyestuff was found to be 549.5 nm.

Diazo Coupling Example 2

Acetic acid (40 ml) and n-propionic acid (15 ml) were added to 2-aminothiazole sulfate (2.96 g) and the whole was cooled to −50° C. Under stirring at 0 to −50° C., nitrosyl sulfate (43.8%, 6.4 g) was added thereto and the whole was stirred to obtain a diazo solution. The diazo solution thus obtained was added to disodium 2-naphthol-3,6-disulfonate (7.0 g) dissolved in ice-water (300 ml). Coupling was effected by adding a 20% aqueous NaOH solution at 50° C. or lower and adjusting to pH 3. Sodium chloride (40 g) was added thereto and solid mass was collected by filtration.

The resulting wet cake was re-dispersed into water (volume: 200 ml), the pH was adjusted to 9.0 with an aqueous NaOH solution, and isopropyl alcohol (300 ml) was added. Precipitated dyestuff was collected by filtration, washed with a mixture of water/isopropyl alcohol=1/1, and dried to obtain the azo dyestuff of the following structural formula (L2) (7.48 g).

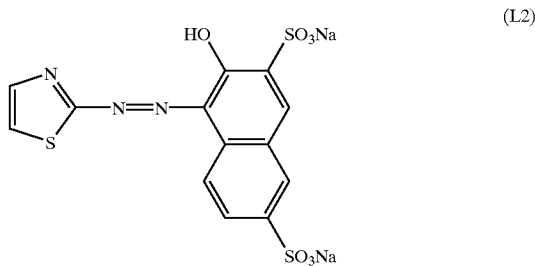

(L2)

Example 21

Preparation of a Nickel Chelated Dyestuff

Water (40 ml) was added to the dyestuff (1.53 g) of the structural formula (L2) and the dyestuff was dissolved by adjusting the pH to 10.0 with an aqueous NaOH solution. Then, an aqueous solution of nickel(II) chloride-hexahydrate (0.792 g) was added dropwise thereto. During the reaction, the pH was adjusted to 5.0 to 6.0 with acetic acid and the whole was stirred. After the disappearance of the raw material, the reaction mixture was added to isopropyl alcohol (80 ml) and precipitated dyestuff was collected by filtration, washed with a mixture of water/isopropyl alcohol=½, and dried to obtain the nickel chelated dyestuff of No. 3-1 in Table 3 (1.63 g).

The maximum absorption wavelength (in water) of the resulting nickel chelated dyestuff was found to be 545.5 nm.

Examples 22 to 29

Preparation of nickel chelated dyestuffs

According to methods similar to Example 21, the following nickel chelated dyestuffs were produced: No. 2-6 in Table 2; No. 3-12 in Table 3; No.4-1, No. 4-2, No. 4-15 in Table 4; No. 5-1, No. 5-2, No. 5-3 in Table 5.

The maximum absorption wavelengths in water of these nickel chelated dyestuffs were measured. The chelated dyestuff used in each Example and the maximum absorption wavelength in water were shown in following Table 8.

TABLE 8

| Example No. | Dyestuff No. | Maximum absorption wavelength (in water) (nm) |
| --- | --- | --- |
| Example 20 | No. 1-35 | 549.5 |
| Example 21 | No. 3-1 | 545.5 |
| Example 22 | No. 2-6 | 521.5 |
| Example 23 | No. 3-12 | 554.5 |
| Example 24 | No. 4-1 | 531.0 |
| Example 25 | No. 4-2 | 527.5 |
| Example 26 | No. 4-15 | 527.5 |
| Example 27 | No. 5-1 | 504.5 |
| Example 28 | No. 5-2 | 507.0 |
| Example 29 | No. 5-3 | 561.0 |

Example 30

Preparation of a Recording Liquid

Water was added to 10 parts by weight of diethylene glycol, 3 parts by weight of diethylene glycol monobutyl ether, and 3.0 parts by weight of the above nickel chelated dyestuff of No. 1-5 obtained in Example 1, and the pH was adjusted to 9 with an aqueous sodium hydroxide solution to make the total amount 100 parts by weight. The composition was thoroughly mixed to dissolve the components. After filtration under pressure through a Teflon (a registered trademark) filter having a pore size of 1 μm, the filtrate was subjected to a degassing treatment by means of a vacuum pump and an ultrasonic cleaner to prepare a recording liquid.

Using the resulting recording liquid, inkjet recording was conducted on each of an electrophotographic paper (Brand name: 4024 paper, a product of Xerox Corporation), a super fine specialized paper (Brand name: MJA4SP1, manufactured by Seiko Epson Corporation), a super fine specialized glossy paper (Brand name: MJA4SP3, manufactured by Seiko Epson Corporation), and a specialized photoprint paper (Brand name: PMA4SP1, manufactured by Seiko Epson Corporation) with an inkjet printer (Brand name: PM-750C, a product of Seiko Epson Corporation). The saturation of the resulting printed matter was measured by Macbeth densitometer (Gretag Macbeth SPM50, manufactured by Macbeth), and quantified as the form of a C* value. Incidentally, the C* value is a numerical value expressing the height or lowness of the saturation of an image. That is, the larger the value is, the higher the saturation is. In the case of the specialized photoprint paper, a good result was obtained at the above measurement wherein the C* value was 77.8. Also, several evaluations were conducted according to the following methods of (a) to (c).

(a) Light Resistance of a Recorded Image

Using a xenon fade-meter (manufactured by Atlas), a recording paper was irradiated at an irradiation energy of 150 to 160 kJ/m² for 80 hours, and the degree of discoloring and fading before and after the irradiation was measured by Macbeth densitometer (Gretag Macbeth SPM50, manufactured by Macbeth), and quantified as the form of a ΔE value. Incidentally, the ΔE value is a numerical value expressing the degree of discoloring and fading. That is, the larger the value is, the larger the degree of discoloring and fading is and the lower the light fastness of the image is. In the case of the specialized photoprint paper, a good result was obtained at the above measurement wherein the ΔE value was 2.1.

(b) Indoor Discoloring and Fading Property of a Printed Image (Ozone Resistance)

In a light-shielded tank having an ozone concentration of 3 ppm, a printed matter was left on standing under a humidity of 50 to 60% for 2 hours, and the degree of discoloring and fading before and after the standing was measured by Macbeth densitometer (Gretag Macbeth SPM50, manufactured by Macbeth), and quantified as the form of a ΔE value. In the case of the specialized photoprint paper, a good result was obtained at the above measurement wherein the ΔE value was 11.2.

(c) Storage Stability of a Recording Liquid

A recording liquid was placed in a container made of Teflon (a registered trademark) and it was tightly closed. Upon the examination after one month storage at 5° C., and 60° C., no precipitation of insoluble matter was observed.

Examples 31 to 39

Preparation of Recording Liquids

Recording liquids were prepared in a similar manner to Example 30 with the exception that azo metal chelated compounds produced in Examples 2, 3, 5, 7, 8, 12, 13, 14, and 15 were used instead of the dyestuff used in Example 30, and printing was conducted in a similar manner to Example 30.

Also, the evaluations according to the methods of (a) to (c) were conducted in a similar manner to Example 30 to obtain good results in all evaluations as shown in Table 9 in the case of the specialized photoprint paper.

Comparative Example 1

A recording liquid was prepared in a similar manner to Example 30 with the exception that the dyestuff represented by the following formula (Comparative dyestuff a):

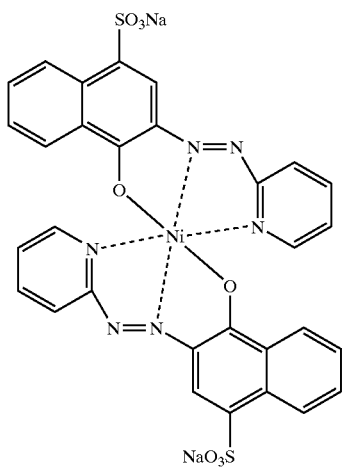

(Comparative dyestuff a)

described in Example 1 of Japanese Patent Laid-Open No. 140367/1999 was used instead of the dyestuff used in Example 30. In a similar manner to Example 30, printing was conducted and the saturation of the resulting printed matter was measured. The evaluations according to the methods of (a) to (c) were conducted in a similar manner to Example 30 to obtain results as shown in Table 9 in the case of the specialized photoprint paper.

The dyestuff in Example 1 of Japanese Patent Laid-Open No. 140367/1999 is an azo metal chelated compound having a pyridine ring and it is understood that the compound is extremely inferior to the compounds of the invention in indoor discoloring and fading property.

Comparative Example 2

A recording liquid was prepared in a similar manner to Example 30 with the exception that Ni (II) complex of the dyestuff represented by the following formula (Comparative dyestuff b):

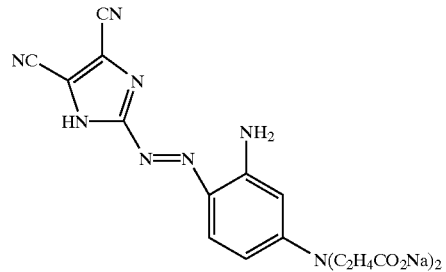

(Comparative dyestuff b)

falling within the range of Japanese Patent Laid-Open No. 259331/1998 was used instead of the dyestuff used in Example 30. In a similar manner to Example 30, printing was conducted and the saturation of the resulting printed matter was measured. The evaluations according to the methods of (a) to (c) were conducted in a similar manner to Example 30 to obtain the results as shown in Table 9 in the case of the specialized photoprint paper.

The azo metal chelated compound used in Comparative Example 2 is one having a benzene ring and it is understood that the compound is extremely inferior in the saturation to the compounds of the invention having a naphthalene ring.

TABLE 9

| Example No. | Dyestuff No. | Saturation (C*) | Light resistance (ΔE) | Indoor discoloring & fading property (ΔE) |
|---|---|---|---|---|
| Example 30 | No. 1-5 | 77.8 | 2.1 | 11.2 |
| Example 31 | No. 1-6 | 76.3 | 2.4 | 13.6 |
| Example 32 | No. 1-9 | 67.7 | 1.3 | 3.9 |
| Example 33 | No. 1-14 | 75.7 | 2.6 | — |
| Example 34 | No. 1-34 | 72.3 | 1.3 | 4.9 |
| Example 35 | No. 1-36 | 71.5 | 1.8 | 6.8 |
| Example 36 | No. 1-46 | 72.8 | 11.0 | 11.2 |
| Example 37 | No. 1-48 | 73.7 | 3.0 | 2.5 |
| Example 38 | No. 1-51 | 74.7 | 3.7 | 2.2 |
| Example 39 | No. 1-52 | 71.7 | 1.2 | 11.3 |
| Comparative Example 1 | Comparative dyestuff a | 69.4 | 4.4 | 17.8 |
| Comparative Example 2 | Comparative dyestuff b | 42.8 | 7.0 | 4.3 |

INDUSTRIAL APPLICABILITY

The dyestuff of the invention is excellent in the solubility in water. When the recording liquid using the dyestuff is employed, as an aqueous inkjet recording liquid, for printing on a plain or specialized paper, a clear recorded matter can be obtained and the dyestuff exhibits an excellent print density, light resistance, and indoor discoloring and fading property, and also a good storage stability as a recording liquid.

What is claimed is:

1. A method for ink jet recording, comprising:
applying to or printing an object with a recording liquid composition comprising one or more metal chelated dyestuff(s), wherein said metal chelated dyestuff(s) is a water soluble azo metal chelated compound formed from an azo compound represented by the following general formula (1) and a metal element,

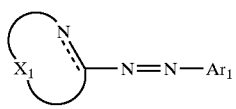

(1)

where general formula (1) represents an azo dyestuff compound having at least one or more hydrophilic group in a molecule, $X_1$ represents plural atoms required for forming at least one 5- to 7-membered heterocyclic ring, the heterocyclic ring containing $X_1$ being a heterocyclic ring other than pyridine ring, the heterocyclic ring containing $X_1$ may have substituent(s) on the heterocyclic ring, the substituent(s) on the heterocyclic ring may form a condensed ring through further condensation, the condensed heterocyclic ring containing $X_1$ may be substituted, $Ar_1$ represents naphthyl group represented by the following general formulae (2)–(4), $Y_1$ represents a chelating group, $Z_1$ represents any substituent which may be different from each other, and a represents an integer of 0 to 6

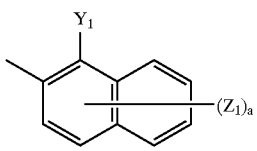

(2)

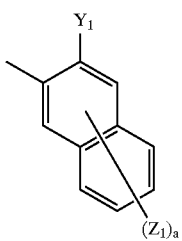

(3)

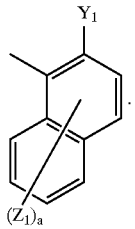

(4)

wherein said one or more dyestuff(s) may be in the form of a free acid, a salt, or a mixture of a free acid and a salt.

2. The method of claim 1, wherein the azo compound represented by the above general formula (1) has a form of salt selected from the group consisting of an alkali metal salt of the azo compound, an ammonium salt of the azo compound which may be substituted with alkyl group or hydroxyl group and an organic amine salt of the azo compound.

3. The method of claim 2 wherein the azo compound represented by the above general formula (1) is a salt of an alkali metal selected from the group consisting of Na, Li and K.

4. The method of claim 2 wherein the azo compound represented by the above general formula (1) is an organic amine selected from the group consisting of lower alkylamines, hydroxy-substituted lower alkylamines, carboxy-substituted lower alkylamines and polyamines having 2 to 10 alkyleneimine units having 2 to 4 carbon.

5. The method of claim 1, wherein the heterocyclic ring containing $X_1$ in the general formula (1) is imidazole ring, pyrazole ring, isoxazole ring, thiazole ring, thiadiazole ring, pyridazine ring, pyrimidine ring, pyrazine ring, benzothiazole ring, benzoxazole ring, or benzimidazole ring.

6. The method of claim 1, wherein in the general formula (1) the heterocyclic ring containing $X_1$ may have one or more substituents, and each substituents on the heterocylic ring is a group which is independent of each other as selected from the group consisting of alkyl group which may be substituted, aryl group which may be substituted, aralkyl group which may be substituted, allyl group which may be substituted, alkoxy group which may be substituted, acyloxy group which may be substituted, acyloxy group which may be substituted, alkoxycarbonyl group which may be substituted, aryloxycarbonyl group which may be substituted, carbamoyl group which may be substituted, acyl group which may be substituted, carboxyl group, hydroxyl group, cyano group, acylamino group which may be substituted, nitro group, halogen atom, phosphono group, sulfo group, mercapto group, allcylthio group which may be substituted, alkylsulfoxy group which may be substituted, alkylsulfonyl group which may be substituted and thiocyanato group.

7. The method of claim 1 wherein in the general formulae (2) to (4), $Y_1$ represents hydroxyl group, carboxyl group, amino group which may be substituted, sulfo group, carbamoyl group, alkoxy group which may be substituted, alkylthio group which may be substituted, alkylsulfonylamino group which may be substituted, or arylsulfonylamino group which may substituted.

8. The method of claim 1, wherein in the general formulae (2) to (4), $Z_1$ each represents independently alkoxy group which may be substituted, aryloxy group which may be substituted, acyloxy group which may be substituted, alkoxycarbonyl group which may be substituted, aryloxycarbonyl group which may be substituted, carboxyl group, carbamoyl group which may be substituted, hydroxyl group, amino group which may be substituted, ureido group, acylamino group which may be substituted, alkylsulfonylamino group which may be substituted, arylsulfonylamino group which may be substituted, phosphono group, sulfo group or sulfamoyl group which may be substituted.

9. The method of claim 8, wherein in the above general formulae (2) to (4), $Z_1$ each represents independently a group selected from the group consisting of carboxyl group, carbamoyl group which may be substituted, sulfo group and sulfamoyl group which may be substituted.

10. The method of claim 1, wherein $Ar^1$ in the above general formula (1) is represented by the above general formula (2) or (4).

11. The method of claim 1, wherein a in the above general formulae (2) to (4) represents an integer of 1 to 3.

12. The method of claim 1, wherein in the general formula (1), the heterocyclic ring containing $X_1$ is represented by the following general formula (5),

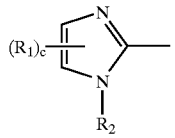

(5)

where $R_1$ may be different from each other and is a group selected from alkyl group which may be substituted, aryl group which may be substituted, aralkyl group which may be substituted, alkoxy group which may be substituted, aryloxy group which may be substituted, acyloxy group which may be substituted, alkoxycarbonyl group which may be substituted, aryloxycarbonyl group which may be substituted, carboxyl group, carbamoyl group which may be substituted, hydroxyl group, acyl group which may be substituted, cyano group, acylamino group which may be substituted, nitro group, halogen atom, sulfo group, mercapto group, alkylthio group which may be substituted and thiocyanato group, $R_1$ may further form a condensed ring together with an imidazole ring, c represents an integer of 0 to 2, and $R^2$ represents hydrogen atom, alkyl group which may be substituted, aryl group which may be substituted or allyl group which may be substituted.

13. The method of claim 12, wherein the general formula (5) is the following general formula (5'),

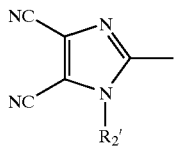

(5')

where $R_2'$ represents hydrogen atom or alkyl group which may be substituted.

14. The method of claim 1, wherein $Ar_1$ is represented by the following general formula (4'),

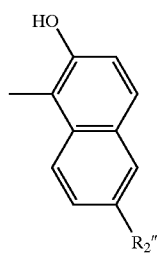

(4')

where $R_2''$ represents sulfo group or sulfamoyl group which may be substituted.

15. The method of claim 1, wherein in the general formula (1), the heterocyclic ring containing $X_1$ is represented by the following general formula (6),

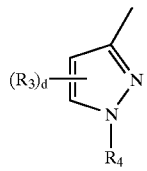

(6)

where $R_3$ may be different from each other and represents alkyl group which may be substituted, aryl group which may be substituted, aralkyl group which may be substituted, alkoxycarbonyl group which may be substituted, aryloxycarbonyl group which may be substituted, carboxyl group, carbamoyl group which may be substituted, hydroxyl group, cyano group or sulfa group, d represents an integer of 0 to 2, and $R_4$ represents hydrogen atom, alkyl group which may be substituted or aryl group which may be substituted.

16. The method of claim 1, wherein in the general formula (1), the heterocyclic ring containing $X_1$ is represented by the following general formula (7),

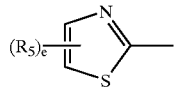

(7)

where $R_5$ may be different from each other and represents alkyl group which may be substituted, aryl group which may be substituted, aralkyl group which may be substituted, alkoxy group which may be substituted, aryloxy group which may be substituted, acyloxy group which may be substituted, alkoxycarbonyl group which may be substituted, aryloxycarbonyl group which may be substituted, carboxyl group, hydroxyl group, acyl group which may be substituted, cyano group, acylamino group which may be substituted, nitro group, halogen atom, sulfo group, alkylthio group which may be substituted or arylthio group, $R_5$ may further form a condensed ring together with thiazole ring, and e represents an integer of 0 to 2.

17. The method of claim 1, wherein in the general formula (1), the heterocyclic ring containing $X_1$ is represented by the following general formula (8),

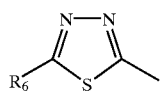

(8)

where $R_6$ represents hydrogen atom, alkyl group which may be substituted, aryl group which may be substituted, aralkyl group which may be substituted, mercapto group, alkylthio group which may be substituted, alkylsulfoxy group which maybe substituted or alkylsulfonyl group which may be substituted.

18. The method of claim 1, wherein the water soluble azo metal chelated compound is a water soluble azo metal chelated compound formed from a metal element selected from nickel, copper and cobalt.

19. An aqueous inkjet recording liquid composition comprising an aqueous medium and at least one metal chelated dyestuff(s)

wherein said one or more metal chelated dyestuff(s) is a water soluble azo metal chelated compound formed from an azo compound represented by the following general formula (1) and a metal element,

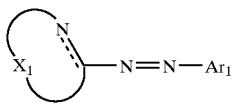
(1)

where general formula (1) represents an azo dyestuff compound having at least one or more hydrophilic group in a molecule, $X_1$ represents plural atoms required for forming at least one 5- to 7-membered heterocyclic ring, the heterocyclic ring containing $X_1$ being a heterocyclic ring other than pyridine ring, the heterocyclic ring containing $X_1$ may have substituent (s) on the heterocyclic ring, the substituent(s) on the heterocyclic ring may form a condensed ring through further condensation, the condensed heterocyclic ring containing $X_1$ may be substituted, $Ar_1$ represents naphthyl group represented by the following general formulae (2)-(4), $Y_1$ represents a chelating group, $Z_1$ represents any substituent which may be different from each other, and a represents an integer of 0 to 6

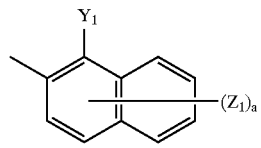
(2)

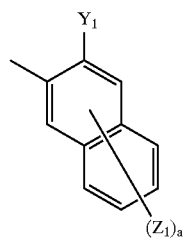
(3)

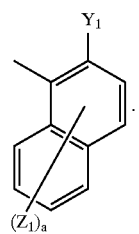
(4)

20. The aqueous inkjet recording liquid composition of claim 19, which consists essentially of an aqueous medium and at least one of said metal chelated dyestuff(s).

21. The method of claim 1 comprising applying or printing a recording paper with said recording liquid composition.

22. The method of claim 1, wherein said one or more metal chelated dyestuff(s) is in the form of a free acid.

23. The method of claim 1, wherein said one or more metal chelated dyestuff(s) is in the form of a salt.

24. The method of claim 1, wherein said one or more metal chelated dyestuff(s) is in the form of a mixture of a free acid and a salt.

25. The composition of claim 19, wherein said aqueous medium comprises water and at least one water soluble organic solvent.

26. The composition of claim 25, wherein the at least one water soluble organic solvent is selected from the group consisting of ethylene glycol, propylene glycol, butylene glycol, diethylene glycol, triethylene glycol, and ethylene glycol (weight average about 190 to 400).

27. The composition of claim 25, wherein the at least one water soluble organic solvent is selected from the group consisting of N-methylpyrrolidone, N-ethylpyrrolidone, 1,3-dimethylimidazolidinone, thiodiethanol, dimethyl sulfoxide, ethylene glycol monoallyl ether, ethylene glycol monomethyl ether, diethylene glycol monomethyl ether, 2-pyrrolidone, and sulfolane.

28. The composition of claim 25, wherein the at least one water soluble organic solvent is selected from the group consisting of glycerol, ethyl alcohol and isopropanol.

29. The composition of claim 25, further comprising at least one surfactant in an amount of 0.001 to 5% by weight.

30. The composition of claim 25, further comprising at least one compound selected from the group consisting of urea, thiourea, biuret and semicabazide in an amount ranging from 0.5 to 5% by weight.

31. An object comprising a printed image produced using the composition of claim 19.

32. Paper comprising a printed image produced using the composition of claim 19.

* * * * *